US005240781A

United States Patent [19]

Obata et al.

[11] Patent Number: 5,240,781

[45] Date of Patent: Aug. 31, 1993

[54] INK RIBBON FOR THERMAL TRANSFER PRINTER

[75] Inventors: Yoshiyuki Obata; Yasuo Tago; Seiko Suenaga, all of Osaka, Japan

[73] Assignee: Fuji Kagakushi Kogyo Co., Ltd., Osaka, Japan

[21] Appl. No.: 810,077

[22] Filed: Dec. 19, 1991

[30] Foreign Application Priority Data

Dec. 21, 1990 [JP] Japan ................................ 2-405177

[51] Int. Cl.$^{5}$ ................................ B32B 9/00

[52] U.S. Cl. ................................ 428/488.4; 428/195; 428/200; 428/474.4; 428/480; 428/484; 428/500; 428/522; 428/913; 428/914

[58] Field of Search ..................... 428/195, 212, 475.5, 428/480, 207, 211, 484, 913, 914, 488.4, 200, 474.4, 484, 500, 522

[56] References Cited

U.S. PATENT DOCUMENTS 4,840,837 6/1989 Tanaka et al. ...................... 428/216
4,865,901 9/1989 Ohno et al. ........................ 428/195

FOREIGN PATENT DOCUMENTS 0154438 9/1985 European Pat. Off. .
0214298 3/1987 European Pat. Off. .
0381297 8/1990 European Pat. Off. .
0367149 9/1990 European Pat. Off. .
61-233587 10/1986 Japan .
61-263797 11/1986 Japan .
62-94382 4/1987 Japan .
62-152790 7/1987 Japan .

OTHER PUBLICATIONS 60-165291 Hotsuta et al. Feb. 7, 1984 Patent Abstracts of Japan #M443 vol. 9 No. 333.

*Primary Examiner*—Patrick J. Ryan
*Assistant Examiner*—W. Krynski
*Attorney, Agent, or Firm*—Armstrong, Westerman, Hattori, McLeland & Naughton

[57] ABSTRACT

An ink ribbon for thermal transfer printer comprising a foundation and a thermal transfer layer, said thermal transfer layer comprising a colored layer containing a wax-like substance as a main component of the vehicle thereof, and a thermoplastic adhesive layer having a film-forming property provided on the surface of the colored layer, said thermoplastic adhesive layer having a melt viscosity of $1\times10^{4}$ to $5\times10^{6}$ cP at a temperature by 40° C. higher than the softening temperature of the adhesive layer, a softening temperature of 45° to 90° C., a solidifying temperature of 25° to 65° C. and a temperature difference of at least 10° C. between said softening temperature and said solidifying temperature. The thermal transfer ink ribbon provides clear images not only on a smooth paper but also on a rough paper even in a high-speed printing or even on printers with different peeling conditions.

5 Claims, 1 Drawing Sheet

INK RIBBON FOR THERMAL TRANSFER PRINTER

BACKGROUND OF THE INVENTION

The present invention relates to an ink ribbon for a thermal transfer printer. More particularly, the invention relates to an ink ribbon for a thermal transfer printer comprising a foundation and a thermal transfer layer provided on the foundation, portions of which layer are selectively softened or melted to be transferred to a receiving medium by selectively controlling the heat generation of a plurality of heating elements provided on a heating head.

The ink ribbon of such a type generally used heretofore includes one wherein a thermal transfer colored ink layer containing a wax-like substance as a main component of the vehicle of the ink is provided on a film-like foundation. The ink ribbon provides clear images on a smooth paper. However, there is the problem that clear images cannot be obtained on a rough paper because the ink does not reach the concave portions of the rough paper, which results in formation of transferred ink images with poor edge definition or voids.

An attempt was made wherein a thermoplastic resin having a film-forming property was incorporated into the colored ink layer in addition to the wax-like substance to improve the film-forming property of the ink layer, and the ink layer was transferred on a rough paper so that the transferred ink layer spanned the concave portion of the rough paper where the ink did not reach like a bridge, as schematically shown in FIG. 1. In FIG. 1, reference numerals 1, 1*a* and 1*b* indicate a rough paper, the convex portion of the paper an the concave portion of the paper, respectively. Reference numeral 2 indicates the colored ink layer transferred. The transferred ink layer 2 is adhered to the paper at the convex portions 1*a* but the ink layer 2 is out of contact with the paper at the concave portion 1*b* and spans the concave portion 1*b* like a bridge.

By means of the above technique wherein the ink layer is transferred so that it spans the concave portions of the receiving medium like a bridge, the transferred ink image is free of poor edge definition and voids, and clear images can be obtained on a rough paper similarly in the case of transfer on a smooth receiving surface.

According to the above-mentioned technique utilizing the ink bridging, it was made possible to print not only on a smooth receiving paper as in the conventional method but also on such a rough paper as mentioned above by means of a thermal transfer printer, which resulted in a further enhancement of utility of the thermal transfer printer.

In such a situation, a printer capable of printing at a high speed of about 100 cps (corresponding to a head moving velocity of about 260 mm/sec) or more was recently put to practical use.

In the case of such a high-speed printer, it was impossible to produce clear images on a rough paper even by using the ink ribbon utilizing the ink bridging and the usable receiving paper was restricted to a smooth paper.

On the other hand, in the case of thermal transfer printers, the distance (hereinafter referred to as "peeling distance") between the position where some portion of the ink ribbon is heated wit the heating head and the position where said heated portion of the ink ribbon is peeled off form the receiving paper (both positions are relative ones with respect to the heating head) or the period of time (hereinafter referred to as "peeling time") between the time when some portion of the ink ribbon is heated with the heating head and the time when said heated portion is peeled off form the receiving paper (herein after, the peeling distance and the peeling time are generically referred to as "peeling condition") varies depending upon kinds of machines. Under the circumstances, there were some cases where an ink ribbon, which was able to provide clear images in a printer with a peeling condition, was not able to provide clear images or absolutely any image in another printed with a different peeling condition.

It is an object of the present invention to provide an ink ribbon for thermal transfer printer capable of providing clear images not only n a smooth paper but also on a rough paper even in a high-speed printing or even on printers with different peeling conditions.

This and other objects will become apparent from the description hereinafter.

SUMMARY OF THE INVENTION

The present invention provides an ink ribbon for a thermal transfer printer comprising a foundation and a thermal transfer layer provided on the foundation, portions of which layer are selectively softened or melted to be transferred to a receiving medium by selectively controlling the heat generation of a plurality f heating elements provide on a heating head, said thermal transfer layer comprising a colored layer containing a wax-like substance as a main component of the vehicle thereof, and a thermoplastic adhesive layer having a film-forming property provided on the surface of the colored layer, said thermoplastic adhesive layer having a melt viscosity of $1\times10^4$ to $5\times10^6$ cP at a temperature by 40° C. higher than the softening temperature of the adhesive layer, a softening temperature of 45° to 90° C., a solidifying temperature of 25° to 65° C., and a temperature difference of at least 10° C. between said softening temperature and said solidifying temperature.

By the use of the ink ribbon of the present invention, clear images with no defects such as poor edge definition and voids can be obtained not only on a smooth paper but also no a rough paper at printing speeds extending between low ones an high ones or under different peeling conditions in thermal transfer printers.

DETAILED DESCRIPTION

Owing to the thermal transfer layer composed as mentioned above in accordance with the present invention, clear images can be obtained not only on a smooth paper but also on a rough paper at printing speeds over a wide range from a low speed to a high speed, for example, from 15 cps to 150 cps (corresponding to head moving velocity of about 40 to about 400 mm/sec), and further on printers with different peeling conditions.

The reason why such effects are exhibited by the above construction is not necessarily definite but is presumed as follows:

In the first place, the transfer mechanism of the colored ink layer in the case that printing is carried out on a thermal transfer printer using a conventional bridging type ink ribbon wherein a thermal transfer colored ink layer having a film-forming property is provided on a foundation.

Figure 1:
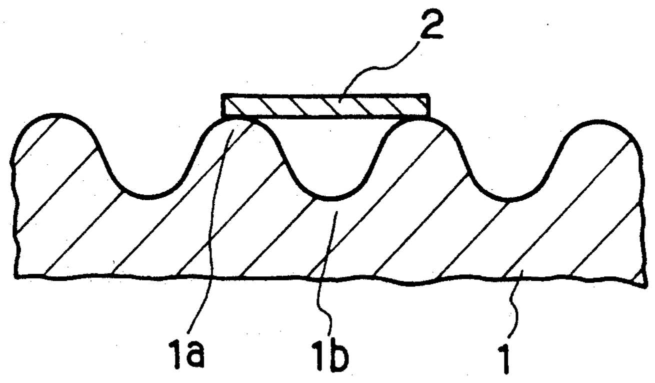
FIG. 1 is an explanatory view showing the state where an ink layer is transferred on a rough paper so that it spans the concave portions of the paper like a bridge.
Figure 2:
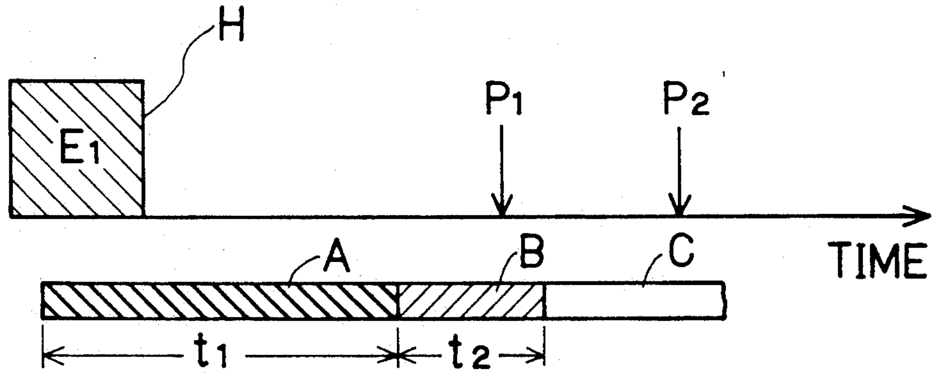
FIG. 2 is an explanatory view showing changes in the state of an ink layer heated with a heating head in the case of a low-speed printing.
Figure 3:
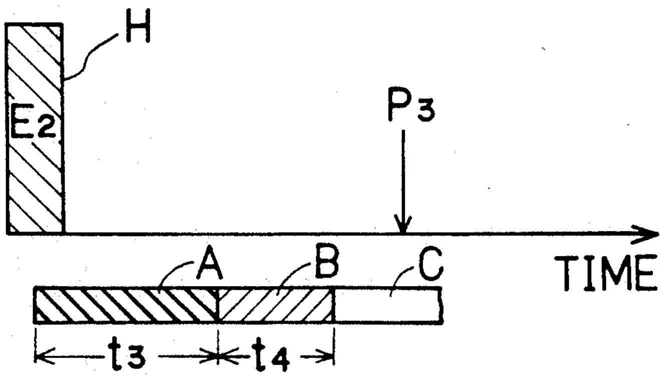
FIG. 3 is an explanatory view showing changes in the state of an ink layer heated with a heating head in the case of a high-speed printing.

FIGS. 2 and 3 are explanatory views showing changes in the state of the ink layer after the ink ribbon is heated with a heating head. FIG. 2 shows that for a low-speed printing and FIG. 3 shows that for a high-speed printing. H indicates a time area where the ink layer is supplied with heat form the heating head and the ordinate indicates the intensity of the supplied heat energy. A, B and C indicate the stages of the ink layer. A indicates the state that the ink is in a state of being softened or melted enough and having a property of sticking to a receiving medium. B indicates the state that the ink, which has been once softened or melted, is again solidifying but is still in a softened state. C indicates the state that the ink is in a state of being again solidified enough.

The investigations of the present inventors have revealed the following: When the ink ribbon is peeled off from the receiving paper while the ink layer is at least in state B, for instance, at peeling point $P_1$, the ink layer in the state B sticks to the receiving paper and peels off from the foundation of the ink ribbon. However, when the ink ribbon is peeled off from the receiving paper while the ink layer is in state C, for instance, at peeling point $P_2$, the ink layer does not peel off form the foundation, because the adhesive strength between the ink layer and the foundation is again increased, which results in failure of transfer.

In the case of low-speed printing, the amount of head energy $E_1$ supplied to the ink layer form the heating head is large because of a long heating time by mean of the heating head. Therefore, time $t_1$ that the ink layer is in state A is sufficiently long and the peeling point of the ink ribbon falls within the total time $T_1$ f time $t_1$ and time $t_2$ $(=t_1+t_2)$(hereinafter referred to as "transferable time") for usual thermal transfer printers, which results in a good transfer.

On the other hand, in the case of high-speed printing, the heating time by means of the heating head must be reduced but the electric power per unit time input to the head cannot be increased enough in connection with the life of the head, etc. Therefore, heat energy $E_2$ supplied to the ink ribbon is smaller than heat energy $E_1$ in the case of low-speed printing. This tendency is marked with increasing printing speed.

Accordingly, time $t_3$ that the ink layer is in state A is shorter than time $t_1$ in the case of low-speed printing, and after all transferable time $T_2$ $(=t_3+t_4)$ is shorter than time $T_1$.

In the case of high-speed printing, the peeling time is shortened because the run speed of the ink ribbon increases. However, since the peeling distance cannot be so reduced in connection with the mechanism around the head, peeling point $P_3$ falls within the area that the ink layer is in state C. Further the period of time that the ink layer after being melted posses a property of sticking to the receiving paper is reduced, which results in an insufficient bonding of the ink to the receiving paper.

For these reasons, poor transfer occurs in the case of high-speed printing.

Even in the case of low-speed printing, there are some cases that the peeling point lags behind to $P_2$ due to the mechanisms around the head of a printer. In this case, poor transfer occurs even in low-speed printing because the peeling point $P_2$ is in the area that the ink layer is in state C.

The function and effect of the present invention are explained.

The thermal transfer layer according to the present invention has a two-layered structure composed of a colored layer on the side of the foundation containing a wax-like substance as a main component of the vehicle and a thermoplastic adhesive layer having a film-forming property provided on the color layer.

The adhesive layer has a melt viscosity of $1\times10^4$ to $5\times10^6$ cP (value measured at a temperature by 40° C. higher than the softening temperature), a softening temperature of 45° to 90° C., a solidifying temperature of 25° to 65° C., and a temperature difference of at least 10° C. between the softening temperature and the solidifying temperature.

Thus the adhesive layer of the present invention possess a supercooling property as well as film-forming property.

Herein, the term "supercooling property" of the adhesive layer means the property that in the case that the adhesive layer is once heated to a temperature above the softening temperature into a softened state and then cooled, the adhesive layer is not solidified but in a supercooled state even when it is cooled to the softening temperature, and the adhesive layer is at last solidified when it is further cooled to a temperature below the softening temperature.

The adhesive layer thus composed possesses such a supercooling property that the adhesive layer which once has been softened by heating with a heating head is not solidified by a temperature drop during a maximum travel time required for the heated portion of the ink ribbon to travel form the position heated with the heating head to the peeling position of the ink ribbon from the receiving medium. Herein, when the distance between the position of the ink ribbon heated with the heating head and the peeling position of the ink ribbon is taken as "d" and the winding-up velocity of the ink ribbon as "v", the period of time t required for the heated portion of the ink ribbon to travel from the heated position to the peeling position is expressed by the equation: $t=d/v$. The time t varied depending upon the structural or operational conditions of a printer. The maximum time t for a printer is referred to as "maximum travel time ($t_{max}$). The maximum travel time varies depending upon kinds of machines. Generally, however, the maximum travel time for printers put on the market at the present ranges from about 2 to about 10 milliseconds.

By the use of an adhesive layer having such a supercooling property as mentioned above, time $t_3$ that he adhesive layer which has been melted or softened enough retains state A in which the adhesive layer possesses a strong stickiness to the receiving paper can be widely extended an the adhesive layer can be in state A or B even at peeling point $P_3$. When the ink ribbon is peeled off form the receiving paper even in high-speed printing, the adhesive layer is firmly adhered to the receiving paper and, therefore, is peeled off form the foundation together with the colored layer containing a wax-like substance as a main component of the vehicle to transfer to the receiving medium.

Even in the case of low-speed printing, time $t_1$ that the adhesive layer retains state A can be widely extended because of its supercooling property. Therefore, a good transfer can be effected even though the peeling point lags behind depending upon the peeling condition of the printer used.

Further, the thermoplastic adhesive layer has a film-forming property, in a softened state, required to form clear images on a rough paper. The portion of the adhesive layer which is once softened shows a fairly weakened bonding to the adjacent portion which is not heated and softened, and exhibits a strong adhesiveness to a receiving paper till the softened portion is again solidified.

The thermoplastic adhesive layer as mentioned above is favorably transferred to even a rough paper together with the colored layer containing a wax-like substance as a main vehicle component so that only the heated portion spans the concave portion of the rough paper like a bride because of its film-forming property, weakened bonding to the adjacent portion in a solid state and good adhesiveness to the receiving paper in a softened state, thereby providing clear images.

Further, in the present invention, the thermal transfer layer is constructed to have a two-layered structure composed of the colored layer and the film-forming adhesive layer and different roles are assigned to the respective layers. Accordingly, the film-forming adhesive layer can be prepared to have such an adhesive formula as to fully exhibit the above-mentioned film-forming property and supercooling property. Further, the ink ribbon of the present invention has the advantage that it has a good resistance to rubbing because the adhesive layer has a great strength.

Thus, the ink ribbon of the present invention can give good images even on a rough paper, complying with both the changes in peeling condition due to the increased printing speed an the different peeling conditions for kinds of machines.

The present invention will be more specifically explained.

The colored layer in the present invention is composed of a vehicle containing a wax-like substance as a main component and a coloring agent.

Examples of the wax-like substance include natural waxes such as whale wax, bees wax, lanolin, carnauba wax, candelilla wax, montan wax and ceresine wax; petroleum waxes such as paraffin wax and microcrystalline wax; synthetic waxes such as oxidized wax, ester wax, low molecular weight polyethylene and Fischer-Tropsch wax; higher fatty acids such as lauric acid, myristic acid, palmitic acid, stearic acid and behenic acid; higher aliphatic alcohols such as stearyl alcohol an behenyl alcohol; esters such as sucrose fatty acid esters, sorbitan fatty acid esters; and amides such as oleic amide. These wax-like substances may be used singly or in admixture. Preferred wax-like substances have a melting point of 40° to 120° C., particularly 65° to 85° C. (value measured at a temperature rising rate of 10° C./min on DSC, hereinafter the same). When the melting point of the wax-like substance is lower than the above range, the melting point of the colored layer becomes too low, which results in poor storage stability of the resulting ink ribbon. When the melting point is higher than the above range, the transfer sensitivity tend to be decreased.

It is preferable to use a thermoplastic resin in addition to the wax-like substance as a vehicle component for the colored layer, thereby adjusting the adhesiveness of the colored layer to the foundation. Examples of such thermoplastic resins include ethylene-vinyl acetate copolymer, ethylene-alkyl (meth)acrylate copolymers, polyolefin resins, polyvinyl alcohol, vinyl acetate resins, styrene-alkyl (meth) acrylate copolymers, styrene resins, saturated polyesters, and further synthetic rubber-like resins such as polybutene, styrene-butadiene rubber and acrylonitrile-butadiene rubber. These thermoplastic resin may be used singly or in admixture. From the viewpoint of transfer sensitivity, the resins preferably have a softening temperature of 45° to 100° C., particularly 50° to 75° C. (the value measured by TMA method, hereinafer the same). The thermoplastic resin in preferably used in an amount of 5 to 50 parts by weight, particularly 10 to 25 parts by weight per 100 parts by weight of the wax-like substance. When the amount of he thermoplastic resin is lower than the above range, the transfer layer is liable to peel off form the foundation under normal conditions. When the amount of the thermoplastic resin is more than the above range, an uneven transfer tend to occur, resulting in the formation of poor edge definition or voids in print images.

As the coloring agent for the colored layer, there can be used any coloring agent used conventionally in ink ribbons of this type, including carbon black, and a variety of organic and inorganic coloring pigments and dyes. The coloring agent is suitably used in an amount of 5 to 80 parts by weight, particularly 15 to 50 parts by weight per 100 parts of the wax-like substance.

If necessary, a variety of surface active agents or oils acting as pigment dispersing agent, dispersion stabilizing agent, flowability controlling agent, or the like may be incorporated into the colored layer. Further other additives such as antioxidant may be incorporated.

Preferably the colored layer has a melting or softening temperature of 50° to 90° C., particularly 65° to 75° C., and a melt viscosity of $5\times10$ to $5\times10^3$ cP, particularly $1\times10^2$ to $1\times10^3$ cP at a temperature by 40° C. higher than the melting or softening temperature (the value measured by means of a viscoelasticity measuring and analyzing apparatus MR-300 made by Rheology Co., Ltd., hereinafter the same), from the viewpoint of securing a desired transfer sensitivity of the ink and a desired transfer amount of the ink. When the melting or softening temperature is lower than the above range, the resulting ink ribbon is poor in storage stability. When the melting or softening temperature is more than the above range, the transfer sensitivity tends to be lowered. When the melt viscosity is lower than the above range, the transferred ink largely spread exceeding the size of the dot of the heating head when heat is accumulated in the heating head and clear images are hardly obtained. When the melt viscosity is more than the above range, an uneven transfer is liable to occur, resulting in the occurrence of poor edge definition or voids in print images.

The film-forming thermoplastic adhesive layer in the present invention has a melt viscosity of $1\times10^4$ to $5\times10^6$ cP, particularly $3\times10^4$ to $2\times10^6$ cP at a temperature by 40° C. higher than the softening temperature of the adhesive layer, a softening temperature of 45° to 90° C., particularly 55° to 75° C. (the value measured at a temperature rising rate of 10° C./min on DSC, hereinafter the same), a solidifying temperature of 25° to 65° C., particularly 30° to 50° C. (the value measured at a temperature falling rate of 10° C./min on DSC, hereinafter the same), and a temperature difference of not less than 10° C., particularly from 10° to 40° C., more particularly from 15° to 30° C. between the softening temperature and the solidifying temperature. Such an adhesive layer possesses good film-forming property and supercooling property with retaining good transfer sensitivity and storage stability.

When the melt viscosity of the adhesive layer is lower than the above range, the property of transferring to a rough paper like a bridge become spoor due to a poor film-forming property. When the melt viscosity is more than the above range, an uneven transfer occurs. In both cases, poor edge definition or voids are liable to occur in print images. When the softening temperature is lower than the above range, the storage stability of the ink ribbon is poor. When the softening temperature is more than the above range, the transfer sensitivity is poor. When the solidifying temperature is less than the above range, the smearing of the receiving paper is liable to occur after printing. When the solidifying temperature is more than the above range, an uneven transfer occurs. When the temperature difference between the softening temperature and solidifying temperature is less than the above range, the supercooling property is poor, which results in failure to comply with the high-speed printer and the different peeling condition.

The adhesive layer is preferably composed of a thermoplastic material having both a film-forming property and a supercooling property and a thermoplastic material having an affinity to the above-mentioned colored layer.

The phenomenon that in transfer printing, the adhesive layer is separated from the colored layer and the adhesive layer alone is transferred is prevented by incorporating a thermoplastic material having an affinity to the colored layer into the adhesive layer.

The thermoplastic material having both a film-forming property and a supercooling property (hereinafter referred to an "thermoplastic material A") is thermoplastic resins such as polycaprolactones, polyamides (JP, A, 62-87392) and unsaturated polyesters (JP, A, 62-35884).

Polycaprolactones are preferred because of their good film-forming property and supercooling property. Preferable polycaprolactones are those having a number average molecular weight of $8\times10^3$ to $1\times10^5$, a softening temperature of 50° to 65° C. a melt viscosity of $1\times10^5$ to $5\times10^6$ cP at a temperature by 40° C. higher than the softening temperature, a solidifying temperature of 25° to 40° C. and a temperature difference of 15 to 35° C. between the softening temperature and the solidifying temperature.

Such polycaprolactones have a good film-forming property because of their great cohesive force in a softened state and also a good supercooling property.

The following effects are exhibited by composing the adhesive layer of thermoplastic material A having good film-forming property and supercooling property. The image forming ability to a rough paper is good because the bridge-like transfer is favorably effected due to said film-forming property and therefore clear images can be formed even on a rough paper. The portion of the adhesive layer which is attached to the surface of a receiving paper can retain its softened state for a long time due to said supercooling property. Therefore, the time till the adhesiveness of the transfer layer to the receiving paper is lowered or lost can be deferred as compared with the conventional ink ribbon. For this reason, it is possible to form clear images in a high-speed printer or a variety of printers with different peeling conditions. For example, it is possible to print very thin lines with a width of 0.05 mm without any poor edge definition or void even on a very rough paper having a Bekk smoothness of about 20 seconds, regardless of the printing speed or the peeling condition.

With respect to the thermoplastic material having an affinity to the colored layer (hereinafter referred to as "thermoplastic material B"), there are preferably used those which are compatible with thermoplastic material A and also with the vehicle of the colored layer. Generally wax-like substances are preferred.

By incorporation of a wax-like substance into the adhesive layer, a good adhesive condition between the adhesive layer and the colored layer is kept during transfer and the colored layer is transferred in the same shape as that of the adhesive layer transferred, thereby preventing the formation of poor edge definition in print image due to the poor edge definition of the colored layer.

Wax-like substances similar to those used in the colored layer are used in the adhesive layer. A thermoplastic resin can be used in combination with the wax-like substance as thermoplastic material B. Thermoplastic resins similar to those used in the colored layer can be used as such a thermoplastic resin for the adhesive layer. By the incorporation of the thermoplastic resin, the adhesiveness of the adhesive layer to a rough paper is further improved, so that the print image formed on a rough paper is completely prevented from peeling off from the paper and a transfer with a lesser amount of energy is made possible. When the thermoplastic resin is used in combination with the wax-like substance, the amount of the thermoplastic resin is preferably from about 0.5 to about 20 parts by weight per 10 parts by weight of the wax-like substance.

Preferably thermoplastic material B has a melting or softening temperature of 50° to 90° C., particularly 55° to 75° C. from the viewpoint of transfer sensitivity or the like.

Thermoplastic material B is preferably used in an amount of 1 to 90 parts by weight, particularly 2 to 50 parts by weight per 10 parts by weight of thermoplastic material A. When the amount of thermoplastic material B is less than the above range, the adhesiveness of the adhesive layer to the colored layer is poor and the effect of enhancing the adhesiveness to the receiving paper is not developed. When the amount of thermoplastic material B is more than the above range, the film-forming property and supercooling property are poor.

Into the adhesive layer, there may be incorporated to the additives in addition to the above mentioned components without spoiling the object of the present invention. Examples of the additives include antioxidant (e.g. phenol derivative antioxidants such as monophenol derivative, bisphenol derivative and polymerized phenol derivatives), an heat resistance improving agent used for preventing blocking occurring between the adhesive layer and the rear surface of the ink ribbon during storage of the ink ribbon in the form of a roll or pancake at elevated temperatures (e.g. body pigments such as silica and titanium oxide, carbon black and organic pigments such as phthalocyanine blue, fine particles of thermosetting resins such as formaldehyde resin, phenol resin and amino resin).

In the present invention, a substantially transparent thermal transfer layer containing substantially no coloring agents may be interposed between the colored layer and the foundation. When such a transparent transfer layer is provided in the ink ribbon, the corresponding transparent layer containing no coloring agents necessarily exists on the surface of the obtained print image. Accordingly, even when the surface of the image is rubbed with an article, there is no possibility that the coloring agent, such as pigment, contained in the colored layer is attache to the article. Further, no problem occurs that the coloring agent is transferred to portions of the receiving paper where no print images are formed to smear the receiving paper.

The transparent transfer layer is preferably composed of a wax-like substance to obtain a good heat melt transferability and an affinity to the colored layer. The same wax-like substances as used on the colored layer are used as the wax-like substance. The preferred is one or mixtures of paraffin wax, polyethylene wax, candelilla wax, ester wax, carnauba wax, and the like. Into the transparent transfer layer, there may be further incorporated a thermoplastic resin which is the same as used in the colored layer, or other adhesive material, in order to control the adhesiveness. The transparent transfer layer preferably has a melting point of 65° to 80° C.

Other additives such as dispersing agent, antioxidant, oil for viscosity control, and surface active agent may be appropriately incorporated into the transparent transfer layer.

A variety of plastic films generally sued as a foundation film for the is type of ink ribbon, including polyester film, polyamide film and others an be used as a foundation in the present invention. In the case of using such plastic films, it is suitable to provide on the rear surface of the foundation (the surface is sliding contact with the heating head) a conventional stick preventing layer composed of silicone resin, fluorine-containing resin or nitrocellulose, or mixtures of the foregoing resins with lubricating materials, in order to prevent the foundation form sicking to the heating head. High density thin papers such as condenser paper can also be used as the foundation. The thickness of the foundation is preferably from 1 to 9 μm, more preferably from 2 to 4.5 μm in order to obtain a good heat conduction.

The ink ribbon of the present invention can be produced by optionally forming a transparent transfer layer by solvent coating method or hot melt coating method, forming a colored layer thereon by solvent coating method or hot melt coating method, and forming an adhesive layer thereon by solvent coating method. The thickness of the colored layer is preferably form 0.5 to 10 μm, more preferably 1 to 5 μm. The thickness of the adhesive layer is preferably form 0.3 to 5 μm, more preferably 0.5 to 2.5 μm. The thickness of the transparent transfer layer is preferably form 0.1 to 5 μm, more preferably from 0.5 to 3 μm.

In the present invention, either a thermal transfer layer with single color may be formed on single foundation, or a plurality of thermal transfer layers with different colors (e.g. yellow, cyan and magenta, and optionally black) may be formed on single foundation in a side-by-side relationship.

In the case of printing using the ink ribbon of the present invention, clear images can be formed on any paper so long as it has a Bekk smoothness of not less than about 10 seconds, regardless of kinds of paper, e.g. bond paper, paper for PPC and paper for thermal transfer. Of course, clear images can be obtained on smooth plastic films.

The present invention is more specifically described and explained by means of the following Examples. It is to be understood that the present invention is not limited to the Examples, and various change and modifications may be made in the invention without departing from the spirit and scope thereof.

EXAMPLES 1 TO 5 AND COMPARATIVE EXAMPLE 1

Onto the front surface of polyethylene terephthalate film having a thickness of 3.5 μm provided with a stick-preventing layer having a thickness of 0.2 μm composed of silicone resin on the rear surface thereof was applied the composition shown in Table 1 by solvent coating and dried to give a colored layer having the physical properties shown in Table 1.

Each composition shown in Table 2 was applied onto the colored layer by solvent coating and dried to give an adhesive layer having the physical properties shown in Table 2. In the case of Example 5, the composition shown in Table 3 was applied onto the above polyethylene terephthalate film by solvent coating and dried to give a transparent transfer layer having the physical properties shown in Table 3, followed by the successive formation of the colored layer and the adhesive layer.

TABLE 1

| Component | Part by weight |
|---|---|
| Paraffin wax (melting temp. 76° C.) | 100 |
| Ethylene-vinyl acetate copolymer (softening temp. 65° C.) | 10 |
| Carbon black | 20 |
| Thickness (μm) | 3 |
| Melting temp. (°C.) | 74 |
| Viscosity at temp. by 40° C. higher than melting temp. (cP) | 100 |

TABLE 2

| | Ex. 1 | Ex. 2 | Ex. 3 | Ex. 4 | Ex. 5 | Com. Ex. 1 |
|---|---|---|---|---|---|---|
| Composition of adhesive layer (part by weight) | | | | | | |
| Polycaprolactone*1 | 10 (A) | 10 (A) | 10 (A) | 10 (B) | 10 (A) | 10 (SBR*2) |
| Ester wax (melting temp. 62° C.) | 4 | 6 | 1 | 5 | 4 | 6 |
| Ethylene-vinyl acetate copolymer (softening temp. 59° C.) | 6 | 9 | 1 | — | 6 | 4 |
| Phenolic antioxidant | 0.3 | 0.5 | 0.1 | — | 0.3 | 0.3 |
| Physical property of adhesive layer | | | | | | |
| Thickness (μm) | 0.6 | 0.6 | 0.6 | 0.6 | 0.6 | 0.6 |
| Softening temp. (°C.) | 57 | 57 | 57 | 57 | 57 | 75 |
| Solidifying temp. (°C.) | 40 | 45 | 30 | 42 | 40 | 67 |
| Difference between softening temp. and solidifying temp. (°C.) | 17 | 12 | 27 | 15 | 17 | 8 |
| Viscosity at temp. by 40° C. higher | $14 \times 10^4$ | $11 \times 10^4$ | $47 \times 10^4$ | $190 \times 10^4$ | $14 \times 10^4$ | $10 \times 10^4$ |

TABLE 2-continued

| | Ex. 1 | Ex. 2 | Ex. 3 | Ex. 4 | Ex. 5 | Com. Ex. 1 |
|---|---|---|---|---|---|---|
| than softening temp. (cP) | | | | | | |

(Note)
*[1]A: Number average molecular weight: $7 \times 10^4$, softening temp.: 57° C., solidifying temp.: 27° C., difference between the softening temp. and the solidifying temp.: 30° C., viscosity at a temperature by 40° C. higher than the softening temp.: $100 \times 10^4$ cP
B: Number average molecular weight: $11 \times 10^4$, softening temp.: 59° C., solidifying temp.: 28° C., difference between the softening temp. and the solidifying temp.: 31° C., viscosity at a temperature by 40° C. higher than the softening temp.: $350 \times 10^4$
*[2]Styrene-butadiene resin, softening temp.: about 100° C., solidifying temp.: about 86° C., viscosity at a temperature by 40° C. higher than the softening temp.: $100 \times 10^4$

TABLE 3

| Component | Part by weight |
|---|---|
| Paraffin wax (melting temp. 76° C.) | 25 |
| Ester wax (melting temp. 73° C.) | 75 |
| Thickness (μm) | 1.5 |
| Melting temp. (°C.) | 74 |

Employing each of the ink ribbons obtained above, printing tests were conducted on the thermal transfer printers mentioned below under the conditions shown in Table 4.

Low-speed printer: WD-652 (30 cps) made by Sharp Corporation

Medium-speed printer: U1 Pro 501 (45 cps) made by Matsushita Electric Industrial Co., Ltd.

High-speed printer: U1 Pro 503 AI (75 cps) made by Matsushita Electric Industrial Co., Ltd.

The number of dots per one character was 48 for every printer. Paper for thermal transfer (Bekk smoothness: 600 seconds), paper for PPC (Bekk smoothness: 50 seconds) and bond paper (Bekk smoothness: 10 seconds) were used as the receiving paper.

The clearness and the void or poor edge definition were evaluated with the images obtained on the receiving paper according to the evaluation method mentioned below. The results thereof are shown in Table 5.

A. Clearness

One dot printing was carried out. The ration of the area of one dot of the ink actually printed to the area of one dot, i.e. one heating element, of the heating head was determined. The obtained values were graded into five classes as mentioned below.

5 . . . Area ratio: 0.95 to 1.05
4 . . . Area ratio: not less than 0.85, less than 0.95
3 . . . Area ratio: not less than 0.75, less than 0.85
2 . . . Area ratio: not less than 0.55, less than 0.75
1 . . . Area ratio: not less than 0.55

B. Void or Poor Edge Definition

Solid-printing was carried out. The optical density (OD value) of the printed paper was measured at the predetermined five positions and the average value was obtained. The values were graded into five classes as mentioned below.

5 . . . OD value: not less than 1.5
4 . . . OD value: not less than 1.2, less than 1.5
3 . . . OD value: not less than 0.9, less than 1.2
2 . . . OD value: not less than 0.6, less than 0.9
1 . . . OD value: not less than 0.6

TABLE 4

| | Low speed | Medium speed | High speed |
|---|---|---|---|
| Distance between the dot and the peeling position (mm) | 0.4 | 0.4 | 0.4 |
| Printing speed (moving speed of the head) (mm/sec) | 76.2 | 127 | 191 |
| Travel time from the dot to the peeling position (millisecond) | 5.3 | 3.1 | 2.1 |

TABLE 5

| | | Ex. 1 | | Ex. 2 | | Ex. 3 | | Ex. 4 | | Ex. 5 | | Com. Ex. 1 | |
|---|---|---|---|---|---|---|---|---|---|---|---|---|---|
| Printing speed | Receiving paper | A | B | A | B | A | B | A | B | A | B | A | B |
| Low speed | Paper for thermal transfer | 5 | 5 | 5 | 5 | 4 | 5 | 4 | 4 | 5 | 5 | 3 | 4 |
| | Paper for PPC | 5 | 5 | 4 | 4 | 3 | 5 | 4 | 4 | 5 | 5 | 3 | 3 |
| | Bond paper | 4 | 4 | 3 | 3 | 3 | 5 | 3 | 3 | 4 | 4 | 2 | 3 |
| Medium speed | Paper for thermal transfer | 5 | 5 | 5 | 5 | 4 | 5 | 4 | 4 | 5 | 5 | 4 | 4 |
| | Paper for PPC | 5 | 5 | 4 | 4 | 3 | 5 | 4 | 4 | 5 | 5 | 3 | 4 |
| | Bond paper | 4 | 4 | 3 | 3 | 3 | 5 | 3 | 3 | 4 | 4 | 2 | 3 |
| High speed | Paper for thermal transfer | 5 | 5 | 5 | 5 | 4 | 5 | 4 | 4 | 5 | 5 | 3 | 4 |
| | Paper for PPC | 5 | 5 | 3 | 3 | 3 | 4 | 4 | 4 | 5 | 5 | 2 | 3 |
| | Bond paper | 4 | 4 | 3 | 3 | 3 | 4 | 3 | 3 | 4 | 4 | 1 | 1 |

(Note)
*A: Clearness
*B: void, poor edge definition

As is clear from the results shown in Table 5, Examples 1 and 5 provided a high quality of images with no void an no poor edge definition not only on the smooth paper but also on the bond paper at every one of low speed, medium speed and high speed.

Examples 2 to 4 provided almost satisfactory results, which were a little inferior to those obtained in Examples 1 and 5.

In contrast thereto, the images obtained in Comparative Example 1 were poor in clearness and contained remarkable voids and poor edge definition. Poor results were obtained especially in the case of the high-speed printing or the printing on the bond paper.

With respect to Example 5, even though the images on the receiving paper were rubbed with another receiving paper, it was not stained. Further, any stain did not occur which was caused due to the phenomenon that the coloring agent contained in the print image was transferred to protons of the receiving paper where no images were formed.

In addition to the materials and ingredients used in the Examples, other materials and ingredients can be used in the Examples as set forth in the specification to obtain substantially the same results.

What we claim is:

1. An ink ribbon for a thermal transfer printer comprising a foundation and a thermal transfer layer provided on the foundation, portions of which layer are selectively softened or melted to be transferred to a receiving medium by selectively controlling the heat generation of a plurality of heating elements provided on a heating head, said thermal transfer layer comprising a colored layer containing a wax-like substance having a melting point of 40° to 120° C. as a main component of the vehicle thereof, and a thermoplastic adhesive layer having a film-forming property provided on the surface of the colored layer, said thermoplastic adhesive layer having a melt viscosity of $1\times10^4$ to $5\times10^6$ cP at a temperature by 40° C. higher than the softening temperature of the adhesive layer, a softening temperature of 45° C. to 90° C., a solidifying temperature of 25° to 65 C., and a temperature difference of at lest 10° C. between said softening temperature and said solidifying temperature and comprises a thermoplastic material having an affinity to said colored layer and polycaprolactone, said colored layer having a melting or softening temperature of 50° to 90° C. and a melt viscosity of $5\times10^1$ to $5\times10^3$ cP at a temperature by 40° C. higher than the melting or softening temperature of the colored layer.

2. The ink ribbon of claim 1, wherein said polycaprolactone has a number average molecular weight of $8\times10^3$ to $1\times10^5$, a softening temperature of 50° to 65° C., a melt viscosity of $1\times10^5$ to $5\times10^6$ cP at a temperature by 40° C. higher than the softening temperature, a solidifying temperature of 25° to 40° C. and a temperature difference of 15° to 35° C. between the softening temperature and the solidifying temperature.

3. The ink ribbon of claim 1, wherein said thermoplastic material having an affinity to said colored layer is a wax-like substance having a melting point of 40° to 120° C.

4. The ink ribbon of claim 1, which further comprises a second thermal transfer layer which is a substantially transparent thermal transfer layer containing substantially no coloring agent interposed between said colored layer and said foundation.

5. The ink ribbon of claim 1, wherein said colored layer contains, as a vehicle, 100 parts by weight of a wax-like substance having a melting point of 40° to 120° C. and 5 to 50 parts by weight of a thermoplastic resin.

* * * * *